(12) United States Patent
Cook et al.

(10) Patent No.: US 7,997,230 B2
(45) Date of Patent: Aug. 16, 2011

(54) MANUAL LITTER BOX

(75) Inventors: Alan Jay Cook, Chicago, IL (US); Thomas Edward Devlin, Somerville, MA (US); Leon Helfet, Camarillo, CA (US); Kevin John Augustyniak, Elma, NY (US)

(73) Assignee: Lucky Litter LLC, Chicago, IL (US)

( * ) Notice: Subject to any disclaimer, the term of this patent is extended or adjusted under 35 U.S.C. 154(b) by 117 days.

(21) Appl. No.: 12/581,080

(22) Filed: Oct. 16, 2009

(65) Prior Publication Data
US 2010/0095898 A1    Apr. 22, 2010

Related U.S. Application Data

(60) Provisional application No. 61/105,911, filed on Oct. 16, 2008.

(51) Int. Cl.
*A01K 1/01* (2006.01)
(52) U.S. Cl. ....................................................... 119/166
(58) Field of Classification Search .................. 119/166, 119/161, 163, 169; 209/233, 417, 418
See application file for complete search history.

(56) References Cited

U.S. PATENT DOCUMENTS

| | | | | |
|---|---|---|---|---|
| 4,190,525 A * | 2/1980 | Menzel | ............ | 209/235 |
| 4,854,267 A * | 8/1989 | Morrow | ............ | 119/161 |
| 5,048,465 A * | 9/1991 | Carlisi | ............ | 119/166 |
| 5,188,062 A * | 2/1993 | Joy et al. | ............ | 119/164 |
| 5,226,388 A * | 7/1993 | McDaniel | ............ | 119/166 |
| 5,259,340 A * | 11/1993 | Arbogast | ............ | 119/166 |
| 5,544,620 A * | 8/1996 | Sarkissian | ............ | 119/166 |
| 6,082,302 A * | 7/2000 | Thaler et al. | ............ | 119/161 |
| 6,378,461 B1 * | 4/2002 | Thaler et al. | ............ | 119/166 |
| 6,568,348 B1 * | 5/2003 | Bedard | ............ | 119/166 |
| 6,588,369 B2 * | 7/2003 | Carlisi | ............ | 119/166 |
| 6,851,386 B2 * | 2/2005 | Northrop et al. | ............ | 119/166 |
| 6,863,026 B2 * | 3/2005 | Northrop et al. | ............ | 119/166 |
| 6,892,670 B2 * | 5/2005 | Northrop et al. | ............ | 119/166 |
| 6,951,190 B2 * | 10/2005 | Northrop et al. | ............ | 119/166 |
| 7,017,519 B1 * | 3/2006 | Deasy et al. | ............ | 119/166 |
| 7,096,824 B1 * | 8/2006 | Deasy | ............ | 119/166 |
| 7,137,355 B1 * | 11/2006 | Wan | ............ | 119/166 |
| 7,263,951 B2 * | 9/2007 | Gillis et al. | ............ | 119/166 |
| 2002/0134314 A1 * | 9/2002 | Carlisi | ............ | 119/166 |
| 2003/0217700 A1 * | 11/2003 | Northrop et al. | ............ | 119/166 |
| 2004/0129233 A1 * | 7/2004 | Northrop et al. | ............ | 119/166 |
| 2005/0284390 A1 * | 12/2005 | Gillis et al. | ............ | 119/166 |
| 2006/0081191 A1 * | 4/2006 | Deasy et al. | ............ | 119/166 |
| 2007/0039556 A1 * | 2/2007 | Cook et al. | ............ | 119/166 |
| 2009/0288610 A1 * | 11/2009 | Casiana | ............ | 119/166 |

* cited by examiner

*Primary Examiner* — Yvonne R. Abbott
(74) *Attorney, Agent, or Firm* — McDonald Hopkins LLC; Michael J. Femal

(57) ABSTRACT

A manual litter box provides various advantages over the prior art. In particular, in one embodiment, the manual litter box is configured to use a disposable cartridge which may include a litter compartment and a waste compartment. In another embodiment, the cartridge may be non-compartmentalized. The cartridge may be disposable, thus eliminating the need for the user to clean the litter tray and handle heavy litter containers. In other embodiments, the system includes a rake assembly configured with a manual shuttle chassis drive assembly that is protected from contamination. In accordance with another embodiment of the invention, the manual litter box is configured to be used with all types of litter including crystal type litter.

18 Claims, 15 Drawing Sheets

MANUAL LITTER BOX

CROSS-REFERENCE TO RELATED APPLICATIONS

None.

BACKGROUND OF THE INVENTION

1. Technical Field

The present invention relates to a manual litter box and, more particularly, to a manual cleaning litter box having a handle connected to a shuttle carriage attached to a rake assembly movable across a disposable litter tray cartridge to clean animal waste therefrom.

2. Description of the Prior Art

Various litter boxes are known in the art. Both reusable and disposable litter boxes are known. Reusable litter boxes are normally formed from plastic and are configured as a rectangular tray with 3-4 inch sidewalls. Normally, such reusable litter boxes need to be maintained daily or every few days. In order to facilitate the care and cleaning of litter boxes, disposable litter boxes have been developed. Examples of such disposable litter boxes are disclosed in U.S. Pat. Nos. 4,171,680; 4,271,787, 6,065,429. Such disposable litter boxes normally include a disposable box or tray filled with an absorbent material, commonly known as kitty litter.

In order to further facilitate the upkeep of such litter boxes, both self-cleaning and manual litter boxes have been developed. One such self-cleaning litter box that has solved the problem of removing animal waste efficiently is found in pending patent application Ser. No. 10/574,068 ("068") entitled "Self-cleaning Litter Box". However, other commercially available self-cleaning and manual litter boxes primarily use "clay" or "clumping" litters and require the periodic addition of fresh kitty litter and the removal of waste every few days. Examples of such manual litter boxes are disclosed in U.S. Pat. Nos. 2,971,493; 3,752,120; 3,908,597; 4,359,966; 4,870,924; 5,372,095 and 7,395,784, hereby incorporated by reference.

U.S. Pat. No. 4,870,924 ('924) discloses a manual litter box which includes the type of manual removal of the animal waste where the removal of the litter brings the end user in potential contact with the animal waste when cleaning out the litter box. '924 patent includes generally a rectangular litter receptacle or tray 12, a tray cover 14, disposable feces filters 16 and a filter protector 18 in which a quantity of litter material 20. Each disposable feces filter 16 includes straps 66 at the corners to lift out of the tray 12 wherein the litter material passes through holes in the filter but captures the animal feces. Then the filter can be placed in a plastic bag or the like for final disposal. In short, all of the above mentioned patents involve similar removal of various filters, shifters or trays with various holes therein to dispose of the animal waste in which the pet owner may come into contact with the animal waste during cleaning of the litter box or at the final disposal of the filters, shifters or trays.

Self-cleaning litter boxes like the one found in pending '068 patent application is an automatic self-cleaning litter box with a motorized rake assembly and a disposable cartridge tray that shows one way to avoid coming in contact with the animal waste. This automatic litter box described in this patent application is a consistently clean, free of hassles involving animal waste and other problems experienced by other known prior art self-cleaning litter boxes and its automation feature allows it to be left alone for weeks at a time. With its disposable litter tray cartridge where the waste is combed into a waste compartment at one end of the disposable tray, this automatic self-cleaning litter box is also convenient when a power source is available.

U.S. Pat. Nos. 5,477,812; 6,082,302; 6,378,461; and Re. 36,847 also disclose self-cleaning litter boxes. These self-cleaning litter boxes disclosed in these patents including many different configurations and use various litters within their litter trays.

But, there are various problems associated with either the self-cleaning or manual litter boxes disclosed in the above-mentioned U.S. patents. First, because these litter boxes often require the use of clumping litter, the waste bin fills quickly with clumped urine and solid waste. Therefore the waste bin must be emptied every few days or more frequently, especially in multiple cat applications. Second, removal of the waste container is cumbersome and often requires the user to come in contact with the waste. Third, fresh kitty litter must be added to the litter tray on an on-going basis. Fourth, the drive assembly of some self-cleaning litter boxes is known to include a drive motor that travels with the rake assembly in a toothed track that is exposed to the litter area. By mounting the motor to the rake, electrical power is applied to a movable chassis, thus requiring a take up reel for an electrical cord, which is known to be inherently risky and prone to failure. When too much litter is used in the litter tray, the motor can be insufficient to drive the rake through the litter, thereby causing a jam which requires the owner to intervene. Conversely, if too little litter is used, or if the cat redistributes the litter in a particular way, a clump can cement to the bottom of the litter pan and prevent the rake from passing through the litter area. In other instances, the cat causes litter to accumulate in the tracks, also causing damage to the drive system and/or requiring further user intervention. Further, the electrical motor is not fully protected from urine, and can be damaged by the cat through normal operation. Also, motors are known to be loud if the litter box is placed in close proximity to the user. Fifth, once again some self-cleaning litter boxes before the '068 patent application are not suitable for use with crystal litter. In particular, due to the irregular shape of the crystal litter and tendency to pack and interlock, a wave tends to build up in front of the rake assembly, which among other things, may prevent the rake assembly from completing a cleaning stroke.

Thus it is desirable to have a manual litter box too, which may include some of the same good design features of the automatic self-cleaning litter box of the pending '068 patent application. This invention is capable of providing similar desirable features only without a motor when power is unavailable or not desirable to use in a particular application. The performance of the present invention of clearing animal waste out of the litter within the litter box is easier than some of the above cited manual litter boxes; is more reliable; does not expose mechanical components to contamination; and is suitable for use with non-clumping litters such as crystal litter.

Therefore, when a power source is unavailable such as a time when a litter box is taken on a family vacation, it is desirable to use a manual litter box that avoids the above mentioned problems with filters, shifters and trays as well as the clumping of the litter material encountered by both the known self-cleaning and manual litter boxes where the entire system must be periodically emptied and disassembled for cleaning. Also, the relative complexity of these above described prior art litter boxes result in the cost of each litter box being relatively expensive.

Thus, the desirable litter box is a manual cleaning litter box with a number of the same features in handling the animal waste with a disposable litter tray as found in pending '068 patent application (hereby incorporated by reference thereto).

SUMMARY OF THE INVENTION

The present invention relates to a manual litter box which provides various advantages over the prior art manual litter boxes. In particular, in one embodiment, the manual litter box is configured to use a disposable tray cartridge that is prefilled with crystal litter and configured to both provide litter and contain waste, thus eliminating the need for the user to clean the litter tray and handle heavy litter supply containers. Of course, the disposable tray cartridge may be filled with other litters beside crystal litter sold by a host of different manufacturers. In other embodiments, the system includes a rake assembly configured with a manual slide drive assembly attached to the rake assembly that allows the operator to clean the litter box without touching the waste. In accordance with another embodiment of the invention, the user manually lifts with a hand or foot a waste trap cover attached to the waste compartment of the disposable tray at a front end of the litter box and then slides a shuttle handle attached to a rake assembly movably affixed to the sides of the box which includes a plurality of spaced apart tines that is configured so that all types of litter including crystal type litter can be used as the user slides the shuttle handle from a back of the box to a front of the box to comb the crystals and thereby rake the animal waste into the waste compartment and then the rake flips over through a mechanical engagement of shuttle hand and the box structure to reverse direction of the rake tines at the waste trap to comb the crystals upon the user returning the shuttle handle to its home position at the back of the box with the waste trap cover lowered to a closed position over the animal waste. The rake tines reverse direction at the waste end for a return groom of the litter as the raking shuttle returns to its home position within the tray through a frictionally engagement of the rake against a frictional obstruction on one or more side rails of the litter box that flips the rake tines in a direction opposite of collecting the waste in the tray of the cartridge.

DESCRIPTION OF THE DRAWING

These and other advantages of the present invention will be readily understood with reference to the following specification and attached drawing wherein.

DETAILED DESCRIPTION

The present invention relates to a manual litter box. FIGS. 1-12 are an illustration of a manual litter box made in accordance with the present invention. The manual litter box includes a disposable litter tray cartridge for holding kitty litter with a waste compartment or trap including a waste trap cover, a rake assembly with tines that comb through the kitty litter attached to a hand shuttle assembly that rides on top of a pair of side rails from a home position adjacent a rear wall to the waste compartment as it traverses the length of the tray cartridge. The broad principles of the invention are applicable to both disposable and reusable litter tray inserts. In one embodiment as illustrated in FIGS. 1-12, a disposable litter tray is provided and configured with two compartments: a litter compartment and a waste compartment. However, the waste trap cover as shown in some of the FIGS. 1, 2, 4 and 6 may also be configured to cover the waste in a disposable litter tray without compartmentalization.

Figure 1:
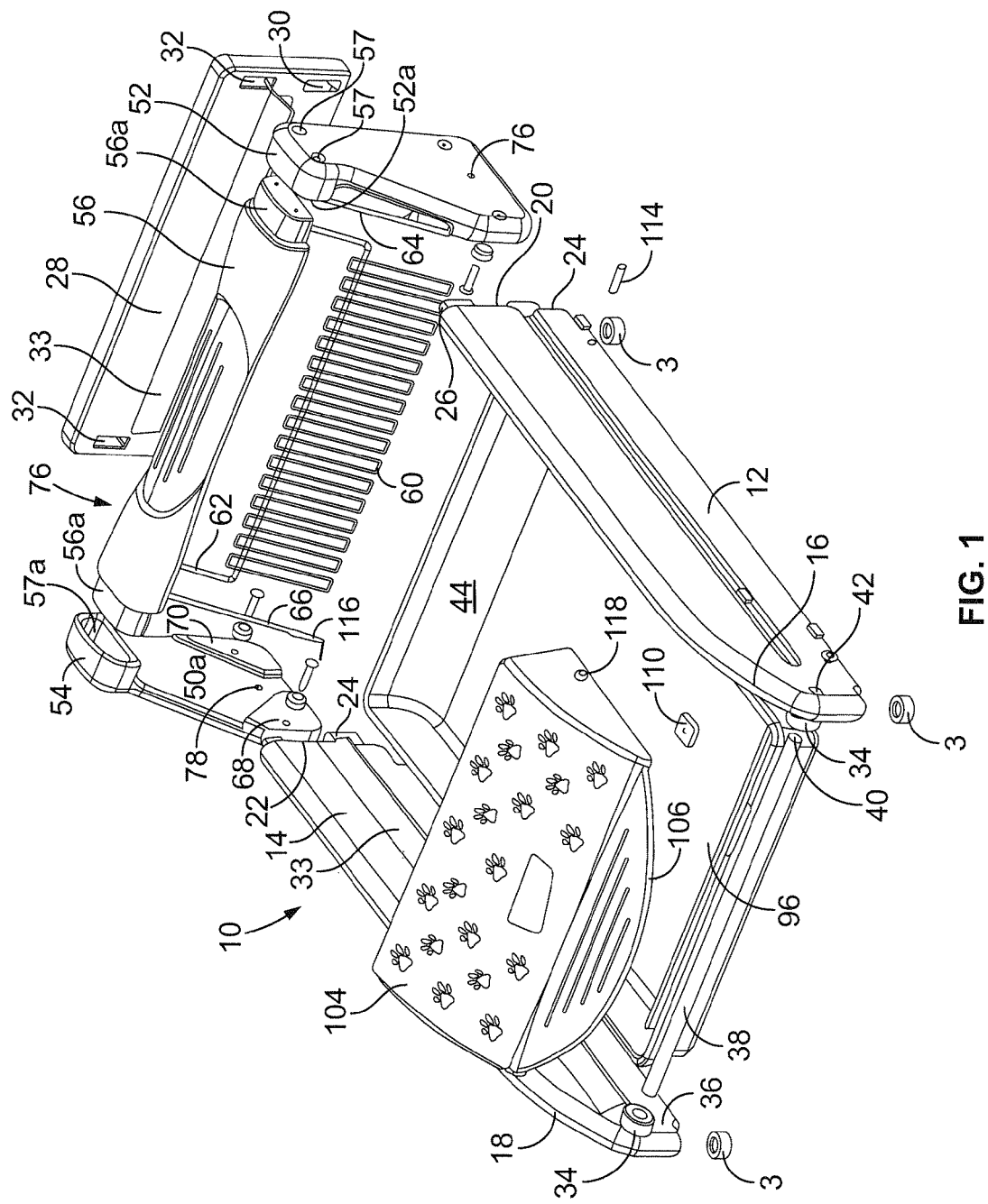
FIG. 1 is an exploded perspective view of a manual litter box with a disposable rectangular tray cartridge configured with a litter waste compartment at one end and a shuttle handle with a rake assembly in accordance with one embodiment of the present invention.

Referring now to FIG. 1, an exploded perspective view of a manual litter box 10 made in accordance with the invention is shown. The manual litter box 10 includes a pair of generally rectangular right and left side rails 12 and 14, respectively, with rounded front ends 16 and 18, respectively, and vertical rear ends 20 and 22, respectively. Each rail at its rear ends 20 and 22, respectively, includes a pair of protrusions 24 and 26. The litter box 10 includes a generally rectangular back rail or real wall 28 having a pair of spaced apart holes 30 and 32 on each end of the wall 28 corresponding to the protrusions 24 and 26 on the right and left rails 12 and 14, respectively, for engaging the holes 30 and 32, respectively, in an interlocking and fixedly relationship when the right and left rails 12 and 14 are assembled to the back rail or wall 28 to form three sides of the generally rectangular shaped manual litter box 10 with the three sides joined together in a U-shaped configuration. The generally flat and rectangular shaped back rail or wall attached perpendicular to the rail ends 20 and 22 of rails 12 and 14, respectively, allows the litter box 10 to be stored in an upright position on its rear wall 28. The curved front ends 16 and 18 of each side rail 12 and 14, respectively, each include a generally circular hole 34 on the inside surfaces 36 of each side rail 12 and 14. A generally circular bar or rod 38 with threaded holes 40 at each end extends horizontally across the predetermined space between the side rails 12 and 14 and is inserted into the circular holes 34 and fastened to the side rails 12 and 14 by a screw 42 passing through each side rail into the threaded holes 40 to fixedly fasten the bar or rod 38 securely to the side rails 12 and 14. The combination of the rod 38 screwed to side rails 12 and 14 securely affixes the rounded ends 16 and 18 of the right and left rails 12 and 14, respectively, and this configuration completes the front end of the generally rectangular shaped manual litter box 10.

The generally rectangular configured and assembled manual litter box 10 as described above is adapted to fit over and engage a disposable and reusable litter tray cartridge 44 as shown in FIG. 1 without a waste cover that will be described in greater detail in FIG. 4. Other features of the litter box 10 are further described below. For example, the manual litter box 10 includes a shuttle carriage assembly 46 comprising a pair of opposing and vertically disposed left and right shuttle arms 48 and 50, respectively, that are spaced apart a predetermined distance and connected to one another at their upper ends 52 and 54, respectively, by a shuttle handle 56. The upper ends 52 and 54 include oval shaped openings 52a and 54a for receiving a pair of opposing tapered and oval ends 56a that snugly fit into the oval shaped openings 52a and 54a, respectively, and generally secured by a pair of screws passing through a pair of screw holes 57 into the oval openings 52a and 54a, respectively, in the upper ends 52 and 54.

A rake assembly 58 includes a number of tines 60 that are used to comb through a kitty litter 61 in the litter tray 44 or a disposable litter tray cartridge with a litter and waste compartments to be described later. The tines 60 are angled backward with respect to the motion direction of the raking assembly 58 and are carried by the shuttle carriage, chassis or bridge 46, transversely disposed above the litter box 10. The rake assembly 58 as best shown in FIG. 1 includes a plurality of tines 60 rigidly secured to a wire frame 62. The wire frame 62 includes a pair of vertical legs 64 and 66. As shown in FIG. 1, for example, the vertical legs 64 and 66 are pivotally coupled toward their bottom ends to the inside of the left and right shuttle arms 48 and 50 by a suitable fastener intermediate the vertical sides thereof.

Figure 7:
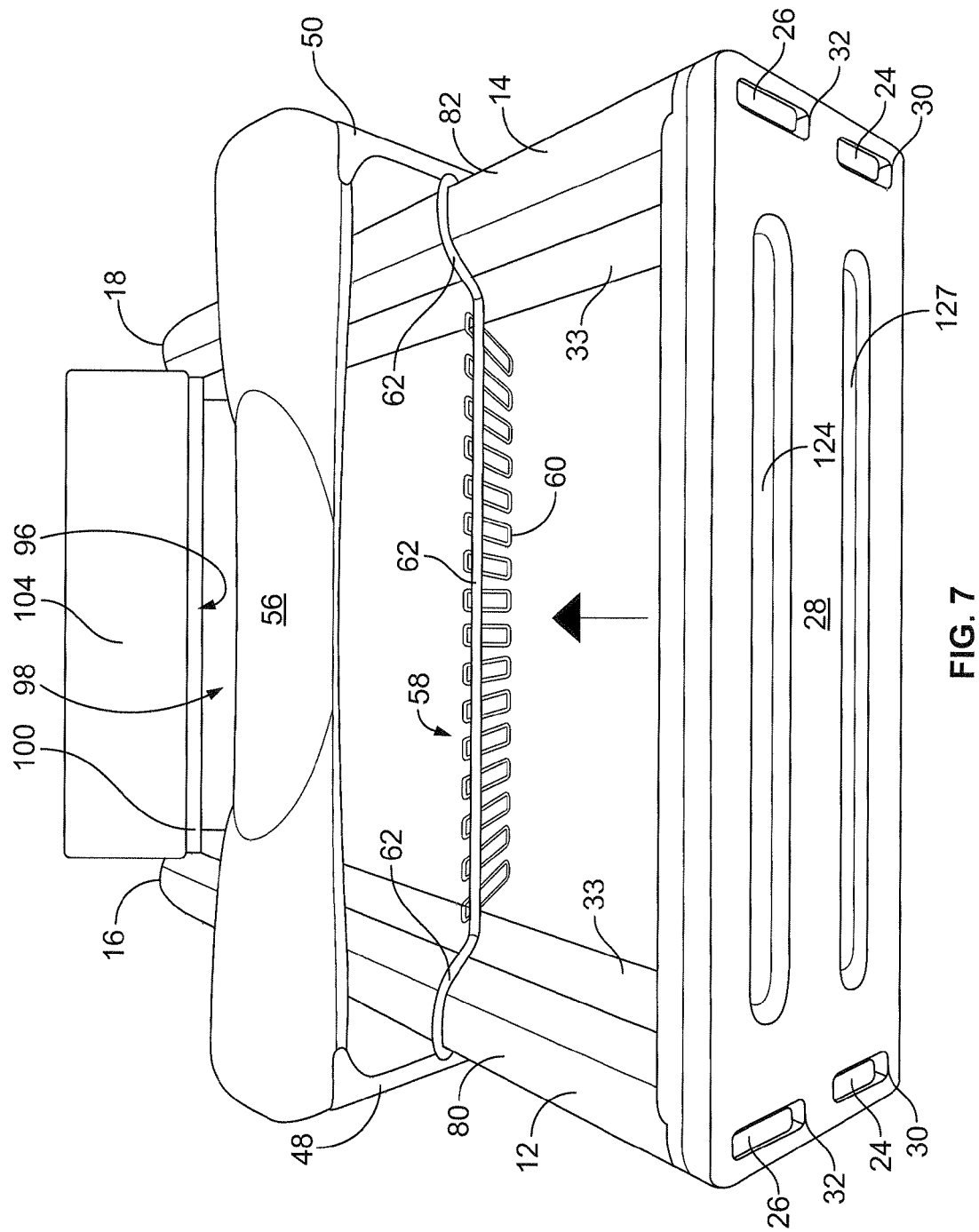
FIG. 7 is a rear top view showing the rake assembly and tines pointing and traveling in the direction of the waste compartment in a manual litter box shown in FIG. 2.
Figure 8:
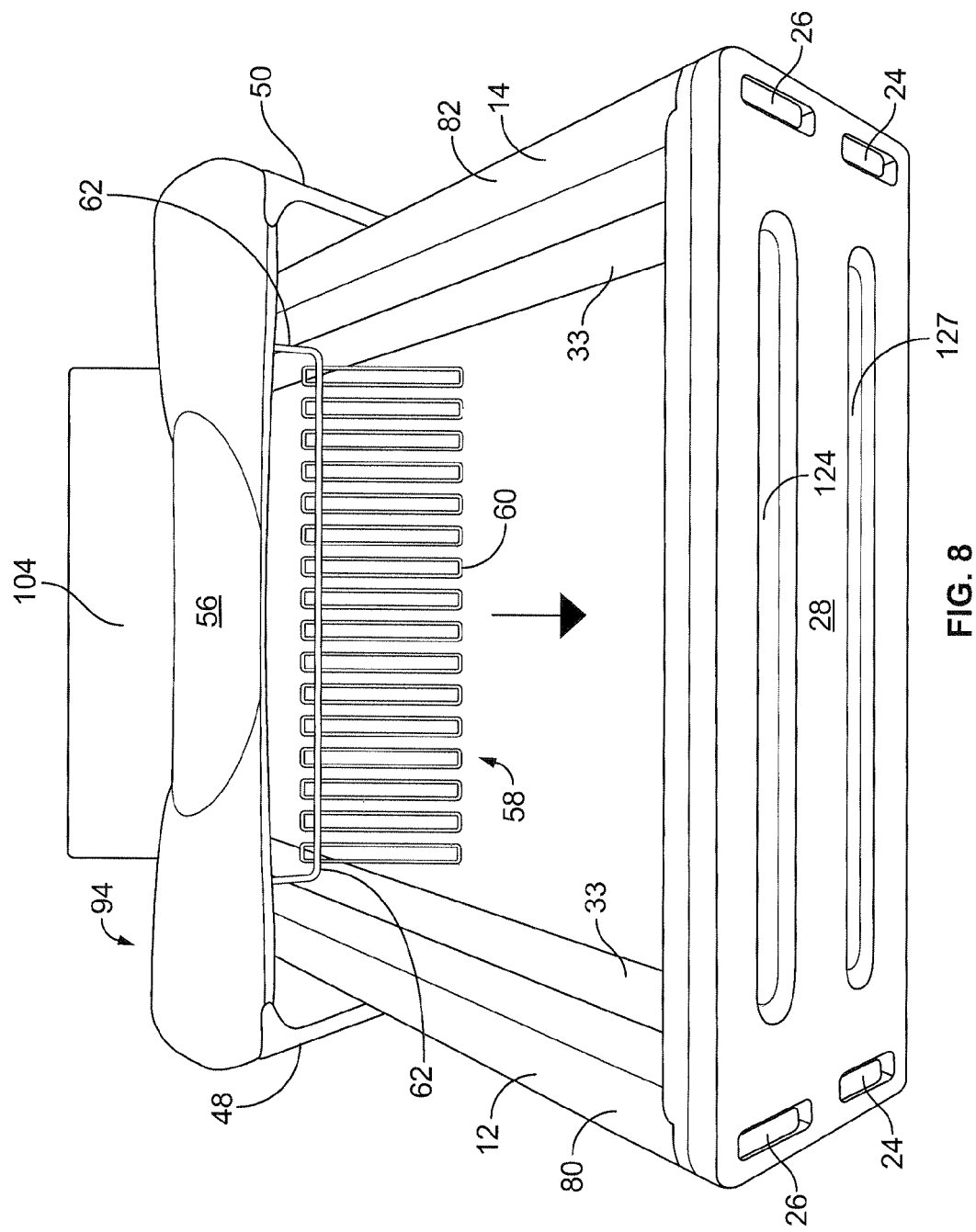
FIG. 8 is a top view of the manual litter box showing the rake assembly and tines pointing and traveling in the direction of the home position at the end of the cleaning stroke of the manual litter box in FIG. 2.
Figure 9A:
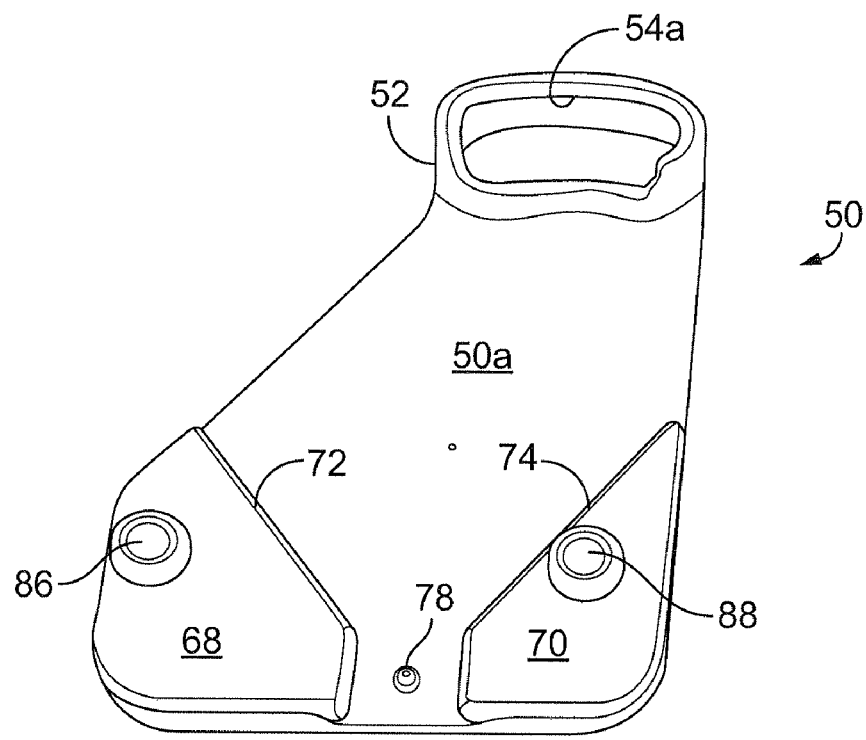
FIG. 9A shows a shuttle arm with a pair of inline wheels for guiding the shuttle assembly across the length of the manual litter box in FIG. 2.
Figure 9B:
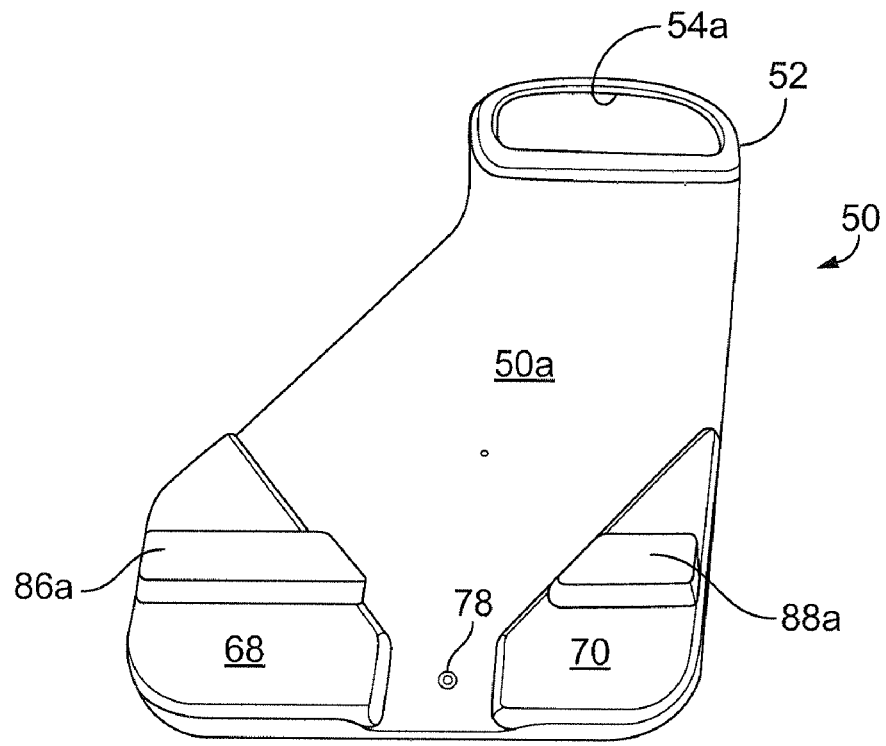
FIG. 9B shows a shuttle arm with a pair of inline blocks for guiding the shuttle assembly across the length of the manual litter box in FIG. 2.

As shown in FIGS. 9A and 9B, each shuttle arm 48 and 50 on inside surfaces 48a and 50a includes a pair of raised embossed surfaces 68 and 70, spaced apart a predetermined distance on each shuttle arm with upper angled edges 72 and 74, respectively, for engaging the vertical legs 64 and 66, respectively, as the rake assembly pivots and changes direction during movement from its cleaning position to its home position within the litter tray 12. A pair of pivot points 76 and 78, allows the rake assembly 58 and its attendant tines 60 to pivot approximately 45 degrees about a vertical axis to rest at approximately a 45 degree angle upon one angled edge 72 on embossed surface 68 or the other angled edge 74 on the embossed surface 70 on inside surfaces 48a and 50a of shuttle arms 48 and 50, respectively, depending upon the direction of movement by the shuttle carriage 46 across the litter tray 44 by an end user. In particular, by pivoting the rake assembly 58 at the bottom of each vertical leg, linear movement of the rake assembly 58 through the litter causes the rake assembly 58 to pivot 45 degrees from vertical position to rest onto the angled edge 72 of the embossed surface 68 during a return stroke, as generally shown in FIGS. 8, 9A and 9B. During a forward stroke, the rake assembly legs 64 and 66 pivot 45 degrees from vertical to rest on the angled edge 74 of the emboss surface 70 at approximately a 45 degree angle relative to a vertical axis, as shown in the FIGS. 6 and 7. The amount of rotation is limited by the both the contact of the wire frame 62 configuration of the rake assembly 58 with rounded tops 80 and 82 of the side rails 12 and 14 as well as the angled surfaces 72 and 74 engaging the vertical legs 64 and 66 about pivot points 76 and 78, respectively. Thus, as the shuttle carriage 46 and its rake assembly 58 changes directions, as shown in FIGS. 7 and 8, the rake assembly 58 and its tines 60 flip positions from one 45 degree angle in one direction of movement to the next 45 degree angle in the opposite direction of movement. The rake assembly 58 and its tines 60 can also be made to flip at pre-determined locations as seen fit for functional requirements by introducing a resistance anywhere above the pivot points 76 and 78 on the respective shuttle arms 48 and 50, respectively, along the length of travel. For example, in FIGS. 14 and 15, an elongated strip of friction material 84 is attached to the outer or inner surface of each side rail 12 and 14 to engage the vertical legs 64 and 66 to flip the orientation of the wire frame 62 and the tines 60 of the rake assembly 58 upon changing direction of travel for the shuttle carriage 46.

The configuration of the tines 60 may be as described below. The importance of backward angle of the rake tines 60 of approximately 45° with respect to travel direction for large size litter such as crystal litter is that it eliminates the wave in front of the tines 60 of the rake assembly 58 thus allowing the manual litter box 10 to be used with crystal litter. Another important benefit of the self flipping wire frame 62 and the angle change of its tines 60 in the rake design with the use of friction material 84 is that the rake tines 60 automatically reverses angle with a change in rake assembly 58 travel direction when the legs 64 and 66 engage the friction strip material 84 either on the inner or outer upper surface of the side rails 12 and 14. This action facilitates raking the kitty litter 61 in both directions, increasing the degree of kitty litter mixing. With better kitty litter mixing, the kitty litter absorbs urine odor better and lasts longer, permitting a longer period of operation before user intervention. Furthermore, the self flipping rake design distributes litter evenly in both rake tines 60 travel directions, preventing a bias of kitty litter to one end or the other of the litter tray cartridge 44 over time. Furthermore, bi-directional raking with the rake tines 60 fully disposed in the kitty litter redistributes and levels the kitty litter in bed of the tray cartridge 44 after a cat has disturbed the litter bed by digging and piling of the litter non-uniformly within the tray cartridge, which is a usual outcome with cats.

As shown in FIGS. 1 and 9A, the pair of vertically disposed right and left shuttle arms 48 and 50, respectively, each include a pair of spaced apart wheels 86 and 88 mounted on the embossed surfaces 68 and 70 in the same horizontal plane that engage a horizontally disposed wheel guide groove 90 running a predetermined length along the outside surface of the right and left side rails 12 and 14, respectively. The wheels 86 and 88 on the left and right shuttle arms 48 and 50 engage the wheel guide grooves 90 on each side rail to smoothly guide the shuttle arm carriage 46 travel across the length of the litter box from a home position 92 adjacent the back rail or real wall 28 to a waste disposal position 94 where the rake tines 60 are underneath the waste disposal portion of the litter tray at front of the litter box.

Figure 4:
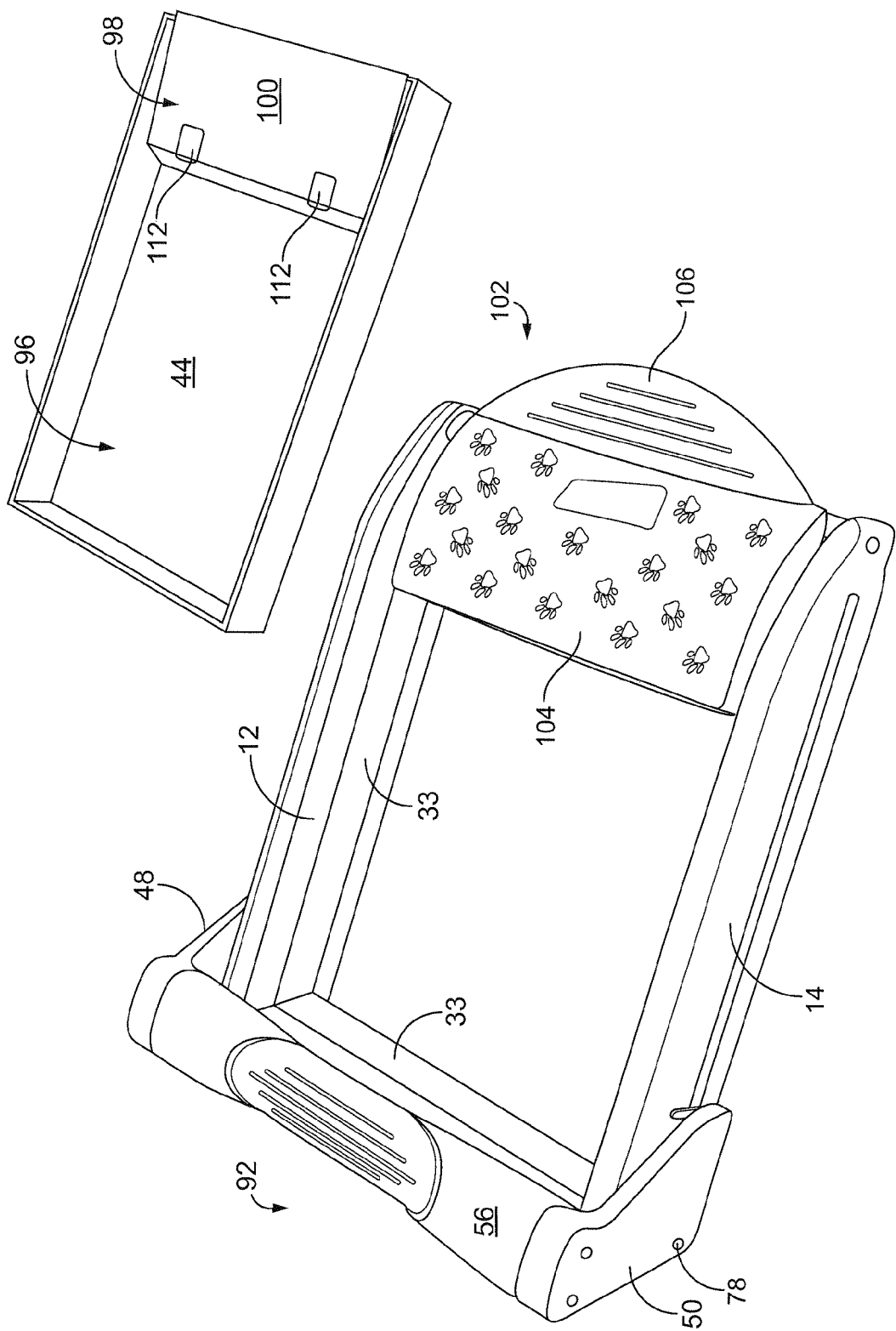
FIG. 4 is a left side perspective view of the manual litter box next to the disposable tray cartridge in FIG. 1.
Figure 5:
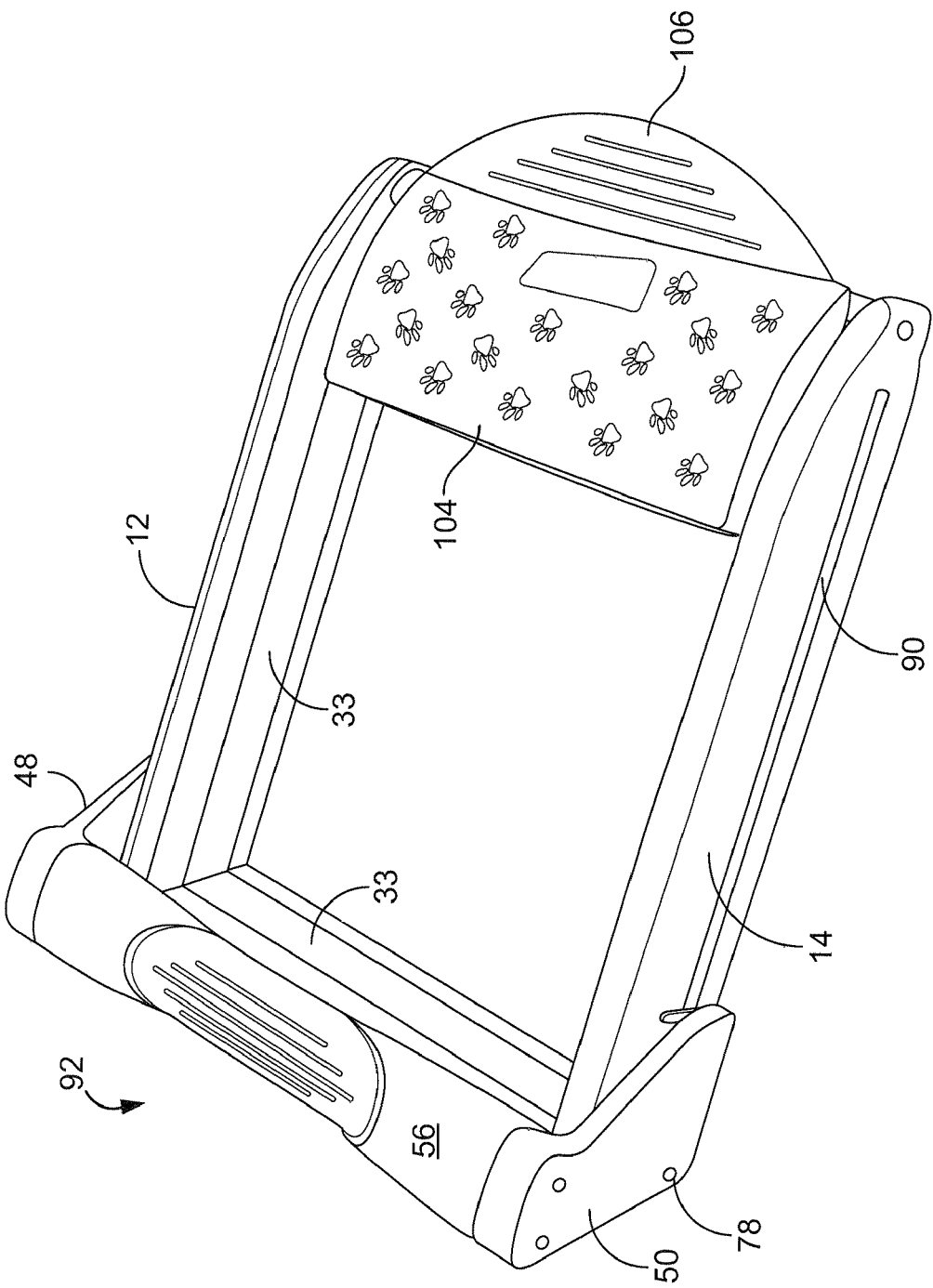
FIG. 5 is a left side perspective of the manual litter box illustrated in FIG. 2, shown without the rake assembly in FIG. 1.
Figure 6:
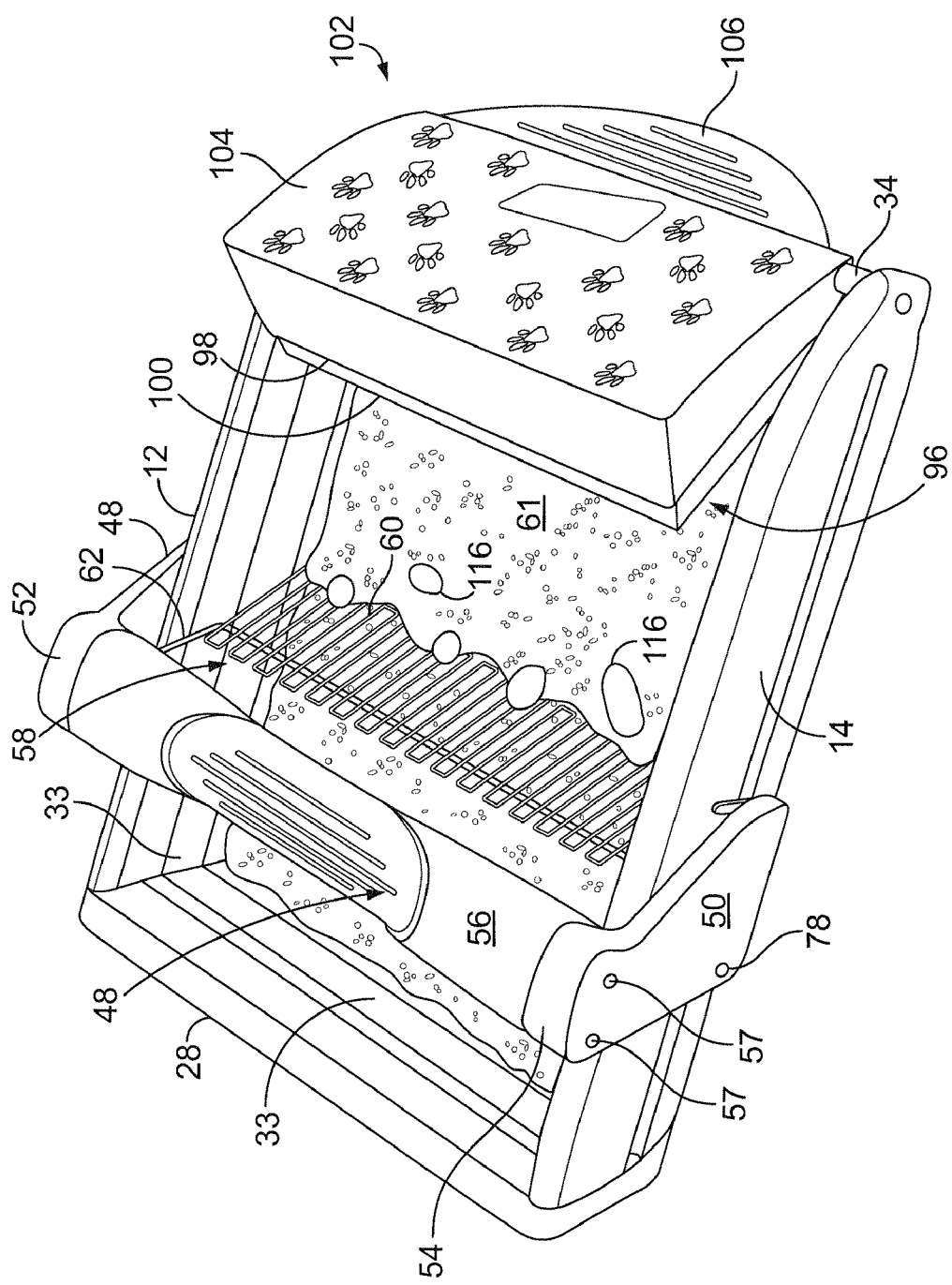
FIG. 6 is a top view of the manual litter box illustrated in FIG. 2, shown with the shuttle handles and rake assembly in an intermediate position during the cleaning stroke while the manual lid assembly lifts the tray cover to the waste compartment.

In FIG. 4, a disposable litter tray cartridge 44 is provided that is non-compartmentalized and includes a litter portion 96 and a waste portion 98 without a barrier therebetween. The waste portion 98 may be provided with a hinged waste cover 100. In operation, the rake assembly 58 that includes the plurality of tines 60 carried by the movable chassis 46 that is adapted to comb the kitty litter 61 in the litter portion 96 during a cleaning stroke. As the rake assembly 58 completes its cleaning stroke, further movement of the rake assembly 58 in the direction toward the waste portion 98 requires the user to lift the hinged cover 100. In one embodiment, the manual litter box 10 includes a lid system 102 with waste trap cover 104 attached to a pedal 106. The lid system 102 further includes a pair of spaced apart clips 108 attached to the underside of the cover 104 for pivotally attaching the trap cover 104 to the bar or rod 38. The underside of the waste cover 104 also includes a pair of spaced apart magnets 110 which connect to a pair of corresponding metal tabs 112 located on the hinged waste cover 10 so when the user either by their hand or foot engage the pedal 106, the pivot action of moving the pedal 106 downwardly causes a lifting of the waste trap cover 104 and the hinged waste cover 100 to enable the solid waste material to be deposited into the waste portion 98 of the non-compartmentalized litter tray.

In one embodiment of the invention as illustrated in FIG. 1, the manual litter box 10 is configured to receive the litter tray cartridge 44 without a waste cover, which may be disposable or reusable. However, even though the manual litter box 10 is illustrated and described with a disposable litter tray cartridge 44, the principles of the present invention are applicable to litter trays with waste covers and to reusable litter trays as well.

In a storage position, the rake assembly 58 rests at next to the back rail or rear wall 28 at the rear end of the litter box 10 with the rake tines 60 below the fill level of the kitty litter 61 to form a compact profile. The wire frame 62 and its tines 60 of the rake assembly 58 are flipped over as it approaches the storage or home position 92 to be ready for action on the next cleaning cycle by a pair of rake flip pins 114 located on the lower rear ends of the right and left side rails 12 and 14 when the lower portion 116 of the vertical legs 64 and 66 that extends below the pins 114 frictionally engage the pins 116 upon the return on the carriage 46 to its home position 92.

The lid system 102 includes a pair of pegs 118 on opposing sides of the cover 104 frictionally engaging the inner surfaces 36 of the rails 12 and 14. This prevents the cover 104 of the lid system 102 from spinning around the bar 38 between rails 12 and 14 when changing litter boxes 10 and the litter box 10 is lifted off the tray 44. In addition, the rails 12 and 14 engage the back rail 28 to form mitered corners 120 but in addition the mitered corners 120 have an overlap vertical edges to prevent pet liquids from leaking through the mitered corners to the outside of the litter box 10.

The rake flipping friction material 48 near the top on the inside 36 of the rails 12 and 14 could be replaced by a tapered rib 48a instead of the friction strip. Moreover, the pair of rake flipping pins or screws 114 in another embodiment are replaced with a pair of blocks 122 placed in a similar position but providing a better moment for lower portion 116 of each leg 64 and 66 to flip the rake frame 62 and its tines 60 into a parked home position 92. Throughout the litter box 10 structure strategically placed holes in the plastic reinforce and lessen the flexibility of the rails 12 and 14 and the back rail or wall 28 of the litter box when assembled to make it a secure structure with less twisting and torque of the material. With the improved strength of the litter box 10, the wheel assemblies 86 and 88 are able to be replaced by shuttle blocks 86a and 88a as shown in FIG. 9B that can fit into new block grooves 90a. The blocks 86a and 88a within the grooves 90a provide the same smooth gliding action of the shuttle carriage 46 across the litter tray 44 as previously shown when the wheels 86 and 88 engaged the wheel grooves 90 on the side rails 12 and 14. The rake screw hole may bolt to receive the rake retaining screws to allow the rake 58 to swing freely. Then air holes are positioned to move below the top edge of cartridge tray 96. However, this assumes the use of blow molded parts where the air holes are positioned below the top edge of the cartridge tray but if injection molding is used there are no such holes. As shown in FIG. 7, the side rails 12 and 14 are strengthened by indentations 124 of a predetermined depth and number that are spaced apart relationship with respect to each other along the inner surface below the tray top on the inner surface of each rail or waste cover. So besides the structural strengthening, the rails 12 and 14 and the cover 102 including the back rail 28 surfaces are made with or without a texture on all of the non-rubbing surfaces of the litter box 10 members depending upon the preferences of the customer.

As will be discussed in more detail below, the various embodiments of the present invention provide various advantages over the prior as will be discussed in detail below. First, the manual litter box 10 may be configured for use with many disposable litter trays. Second, the shuttle carriage assembly 46 and its movable parts like the wheels 86, 88 and pivoting rake assembly 58 are configured to be located outside of the litter compartment 96 of the litter box 10 to protect from contamination. Third, the rake assembly 58 and its tines 60 may be configured to be used with all types of clumping and non-clumping litter including crystal litter 61.

Figure 2:
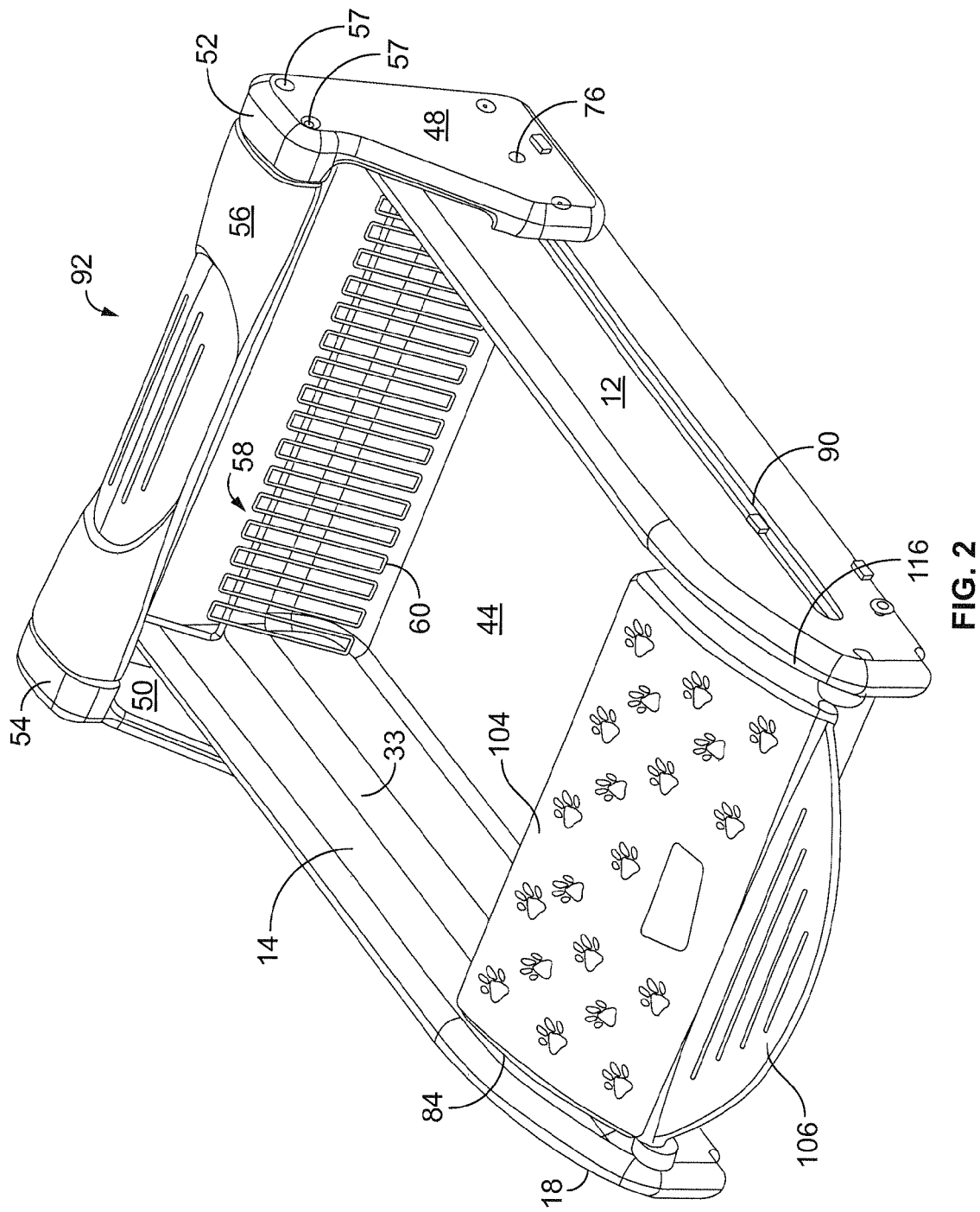
FIG. 2 is a perspective view of the manual litter box in accordance with one embodiment of the present invention shown with the rake assembly in a home position opposite the litter waste compartment.
Figure 3:
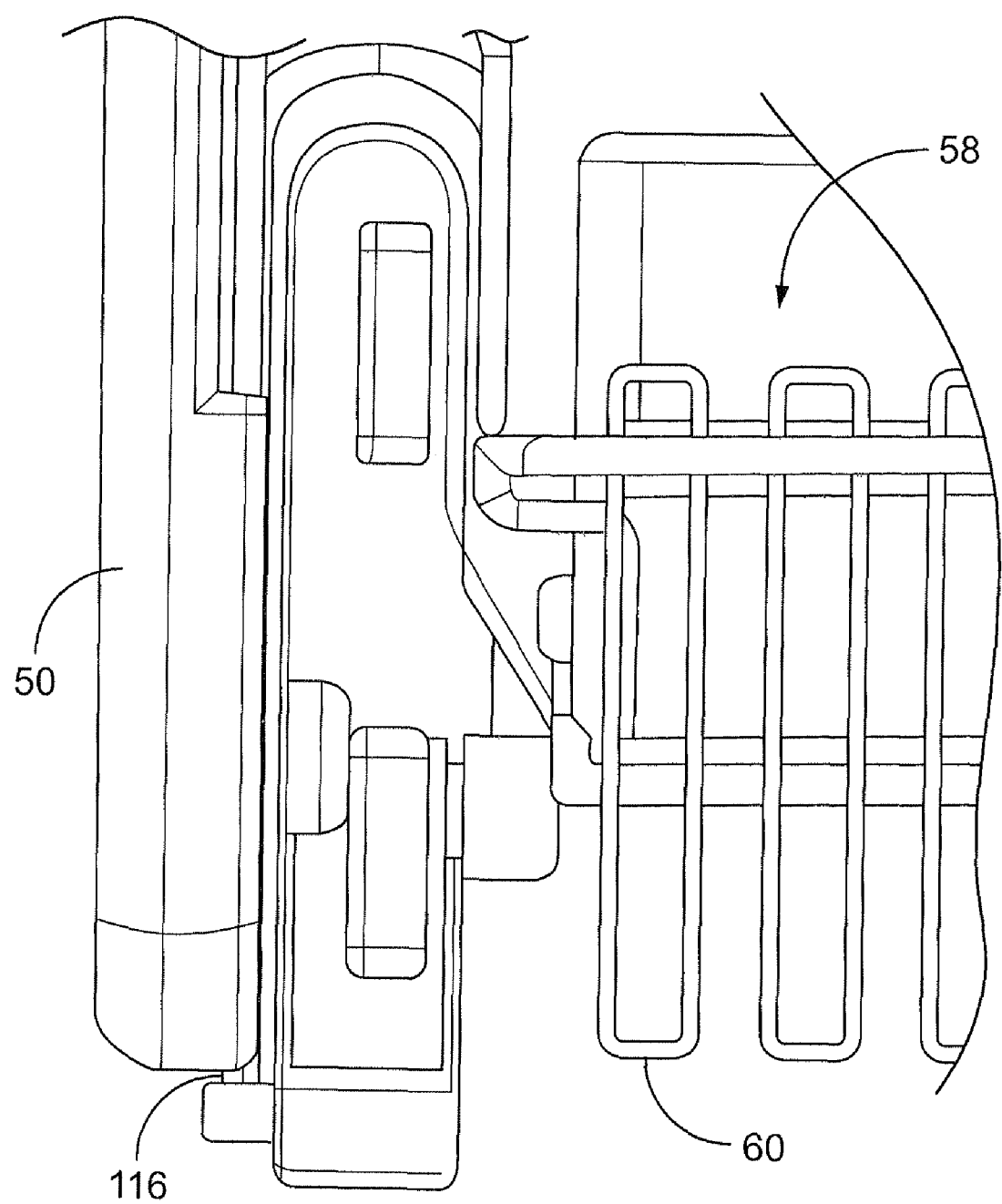
FIG. 3 is a partial end view of a left side rail of the manual litter box shown in FIG. 2, illustrating a friction bump on the side rail to flip the rake detail.
Figure 13:
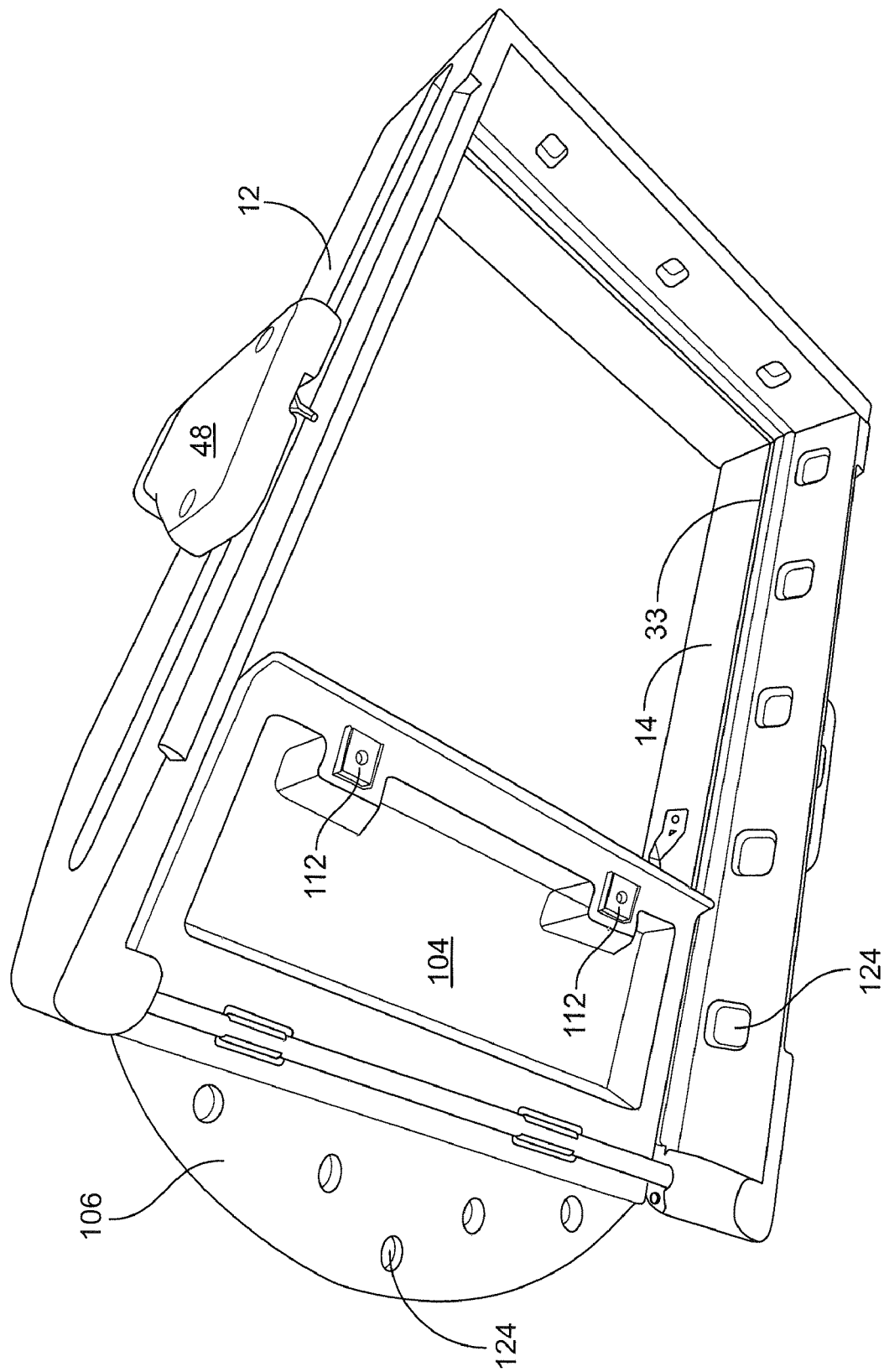
FIG. 13 is a perspective bottom view of the manual litter box of FIG. 1.

FIG. 13 shows a bottom view of the litter box in FIG. 2. A pair of clips 38a made of a flexible material are connected to the bottom of waste cover lid 104 and clip onto the metal bar 38 secured between the rails 12 and 14. A nib on either side of the lid 104 frictionally engage the rails 12 and 14 so that the cover lid does not spin around the bar 38 on its clips 38a when the manual litter box is lifted off the disposable tray cartridge when the user changes waste trays.

Figure 14:
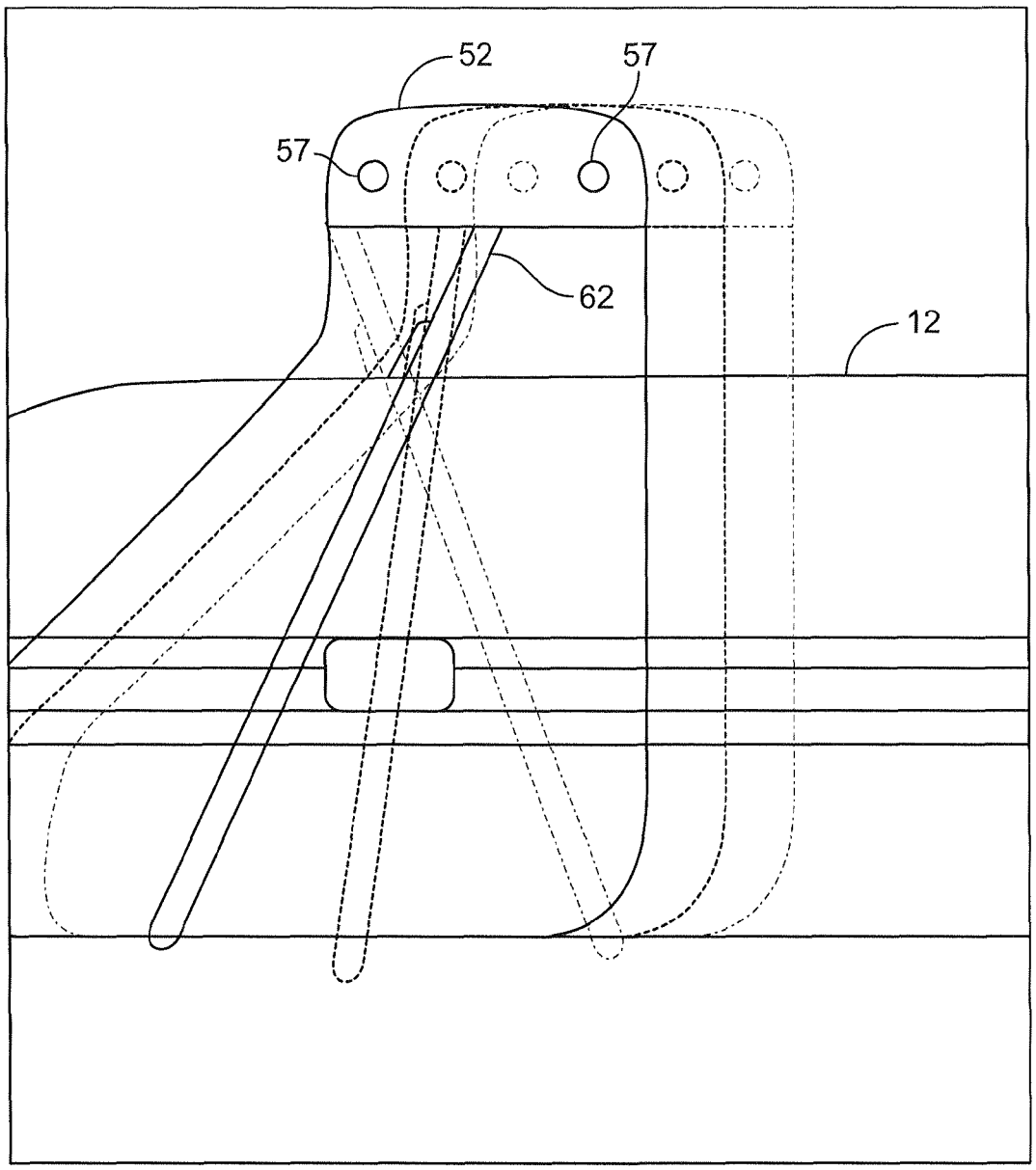
FIG. 14 is a partial side view of the rake leg engaging a block and flipping according to FIG. 1.

FIG. 14 show a partial view of the wire frame 62 and its extended leg 66 portion engaging a block 114a attached to the side rail in an appropriate spot to flip the rake assembly 58 as the leg 66 engages corresponding blocks at either end of the rails 12 and 14 as shown in FIG. 14 and FIGS. 1, 2 and 3.

Figure 15:
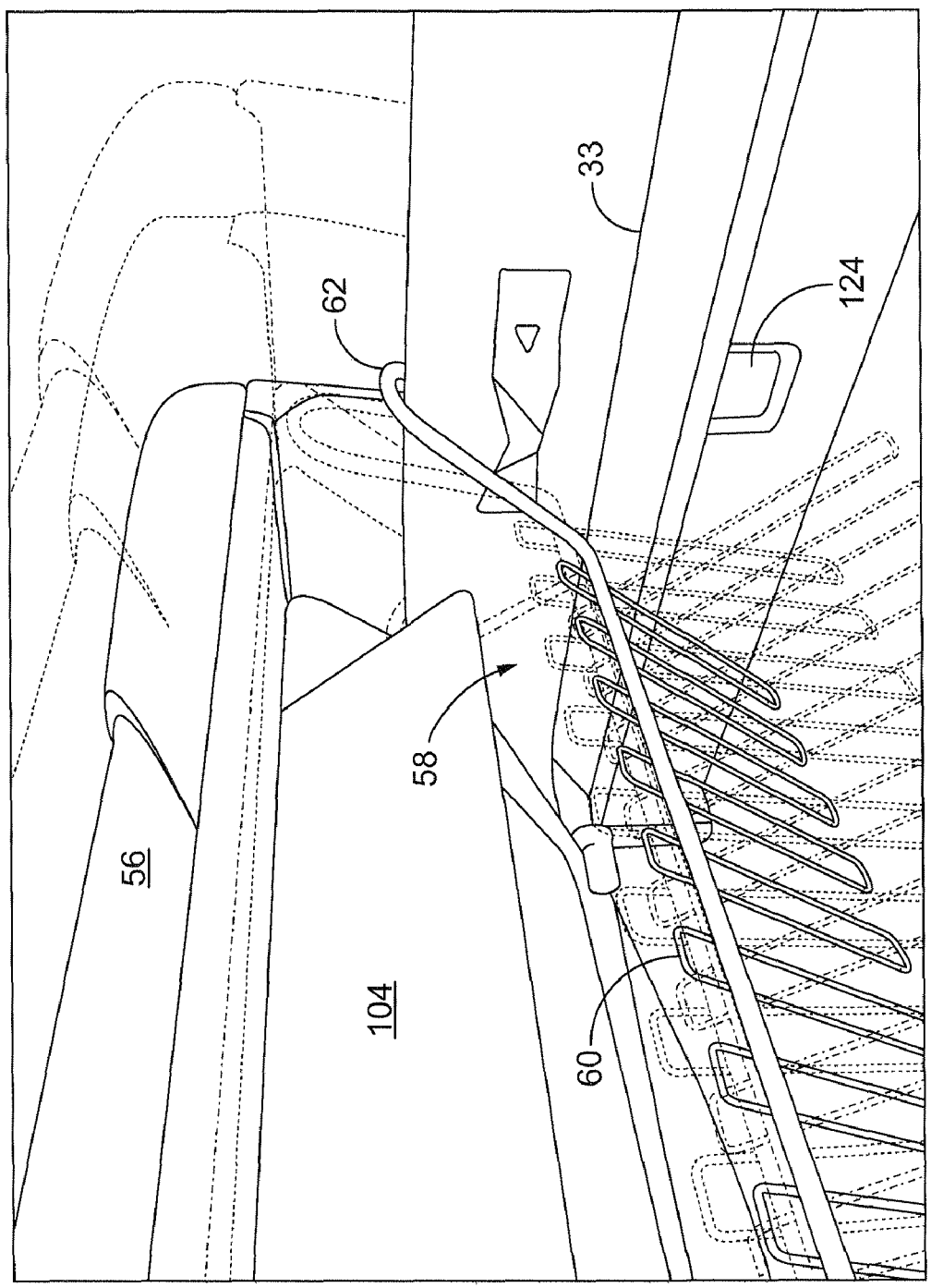
FIG. 15 is a partial view of the rake assembly in the waste position with the rake flipping to travel back to the home position of FIG. 8.

FIG. 15 show a partial view of the rake assembly 58 attached to the carriage arms through wire frame 62 on either side of the carriage handle 56 to flip the direction of its tines 60 upon the wire frame 62 engaging a spring friction barrier 116a located in a predetermined place on the upper side rail 12. The tines 60 scope the solids in the kitty litter 61 underneath the waste lid cover 104 in the direction of the rake assembly to the waste disposal position and then upon grabbing the carriage handle 56 and manually pulling the rake back to its home position 92 the wire frame 62 engages the spring friction barrier 116a and flips the tines in the direction of the home position 92.

Litter Cartridge

In one embodiment of the invention as illustrated In FIG. 1, the manual litter box 10 is configured to receive the litter tray cartridge 44 without a waste cover, which may be disposable or reusable. However, even though the manual litter box 10 is illustrated and described with a disposable litter tray cartridge 44, the principles of the present invention are applicable to litter trays with waste covers and to reusable litter trays as well.

For further description of litter trays the '068 patent application is hereby incorporated by reference thereto. That patent application illustrates compartmentalized litter cartridges which defines a litter compartment and a waste compartment.

The litter tray cartridges 44, 96 are dimensioned to be received within the manual litter box 10 as illustrated in FIGS. 1-11 and 26-29. Replacement of a tray cartridge 44 or 96 is as simple as removing the old tray cartridge and replacing it with a new tray cartridge. Such a configuration provides many benefits relative to known systems. First, the configuration eliminates the need to handle relatively heavy litter supply containers. Second, since the cartridges 44, 96 are disposable; there is no need to clean the tray. Third, the user is not exposed to a dust cloud that is normally created when the dry litter is poured into a litter tray.

Another advantage of the litter tray cartridge 44 as illustrated in FIG. 1 is the shape as a generally rectangular tray is not compartmentalized, which may be disposable. The tray 44 may have a small lid at one end to cover the waste and may have a larger cover to enclose the entire tray for shipment and disposal. An important aspect of the non-compartmentalized litter cartridge 44 is that it simplifies the shuttle carriage 46 and the rake assembly 58 and its frame 62 and tines 60 structure. More particularly, the litter tray cartridge 44 as illustrated in FIG. 1 does not include a separator wall. As such the rake assembly 58 can stay at one level (i.e. travel in a single horizontal plane) during all operational modes since the rake assembly 58 does not have to be lifted over a separator wall. As such, the litter cartridge 44 as illustrated in FIG. 1 may be used with the shuttle carriage 46 without any adjustments in its movements across the litter tray. With a rake assembly 58 that stays at one level, the mechanism driving the rake assembly 58 is simplified, improving reliability and reducing cost.

An additional benefit of the non-compartmentalized litter tray 44 is that the waste is always in contact with the litter. As such, the odor is reduced and drying of the waste is optimized. The solid waste is not removed from the litter as is commonly done with other litter boxes.

Manual Litter Box

Figure 10:
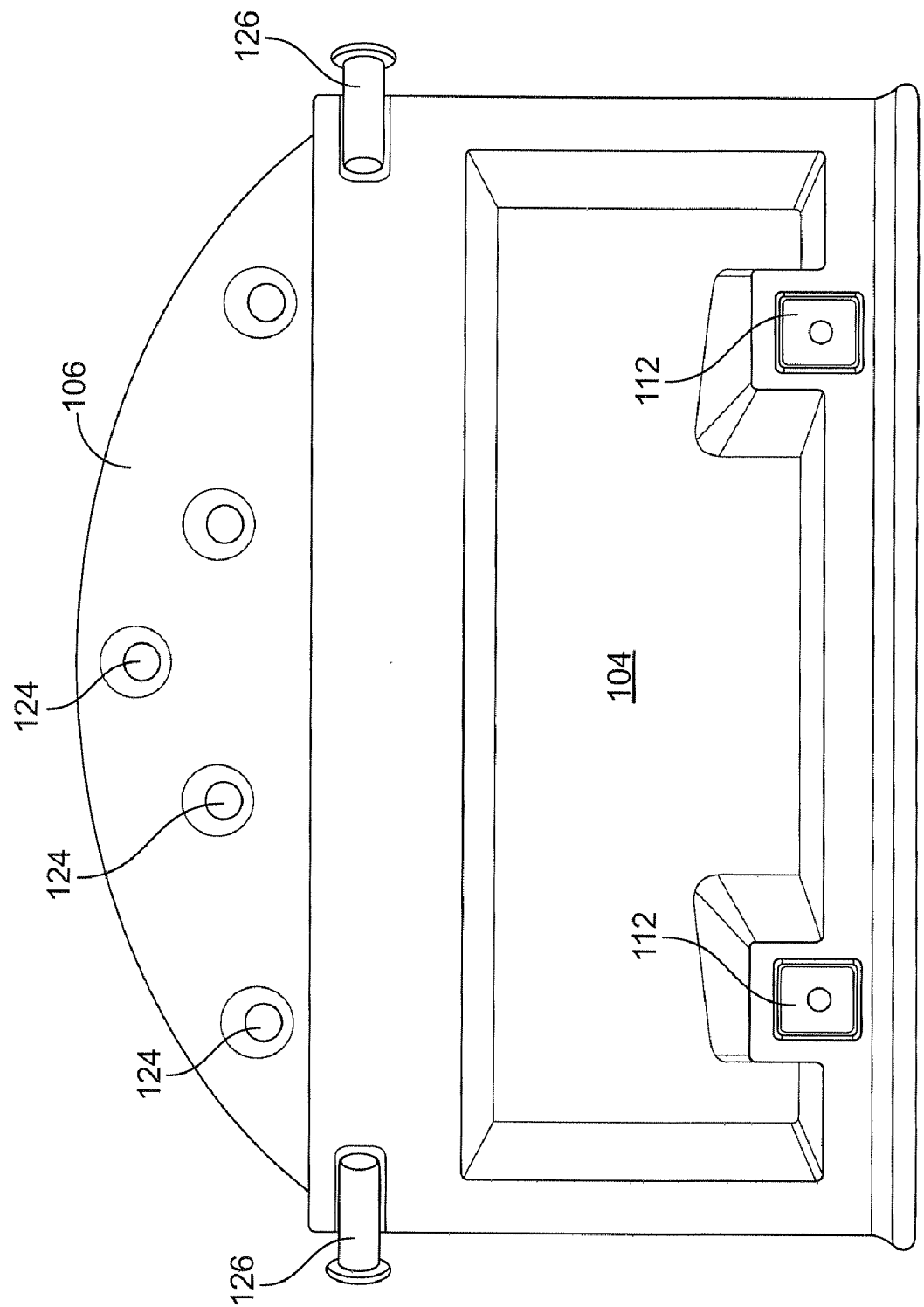
FIG. 10 is a rear view of the manually operated lid cover over the waste cover of the disposal litter tray cartridge shown in FIG. 4.
Figure 11:
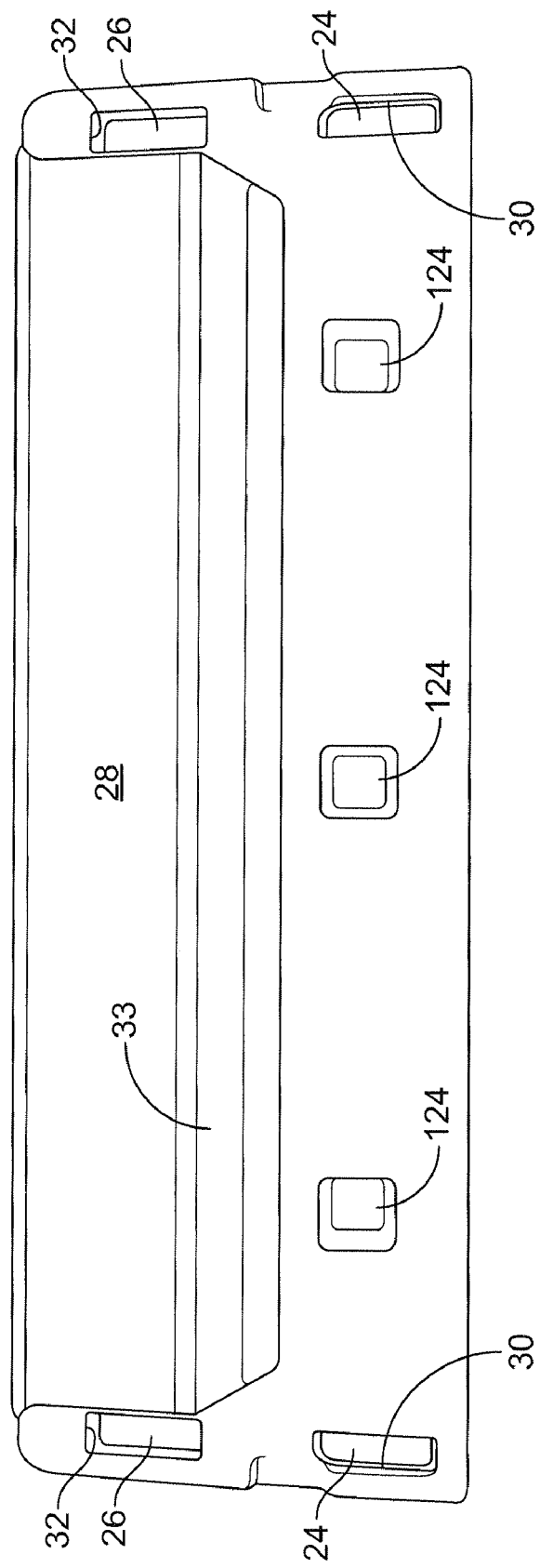
FIG. 11 is a frontal view of the rear wall within the manual litter box as illustrated in FIG. 6 where the rear wall is includes a litter ridge overlaying the top edge of the disposable litter tray cartridge as shown in FIG. 6.
Figure 12:
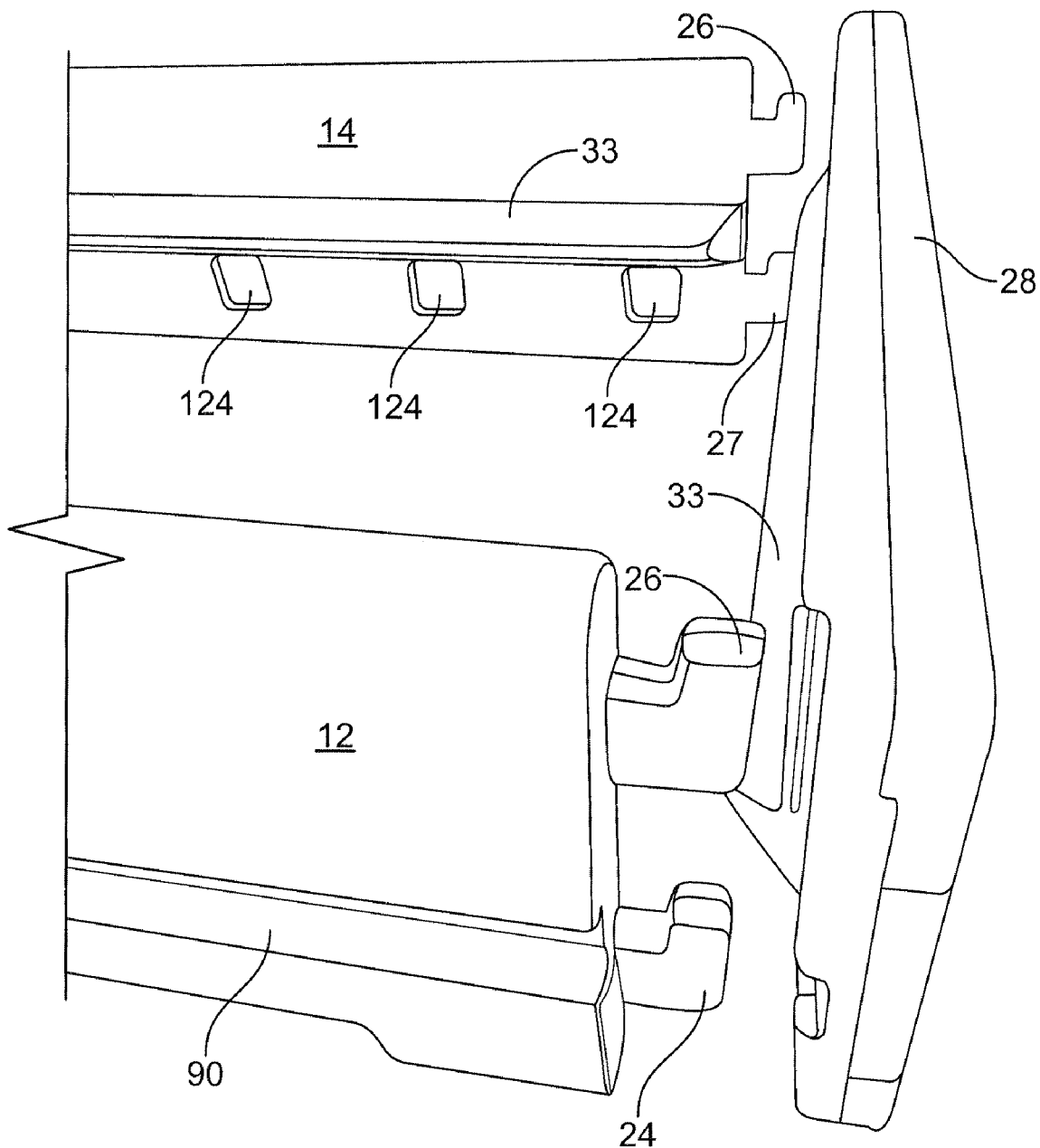
FIG. 12 is a partial perspective side view of the right and left rail walls for insertion into the rear wall as shown in FIG. 2.

The manual litter box made in accordance with the present invention is illustrated in FIGS. 1-12 and generally identified with the reference numeral 10. The manual litter box 10 may be used with or without a disposable litter cartridge 44. The manual litter box 10 may include the pair of spaced apart side rails 12 and 14, a rake assembly 58 and a shuttle carriage assembly 46 but it may also include one or more rods 38 to connect the side rails 12 and 14 together at other points along the side rails for strength and rigidity of the litter box frame. An alternative attachment for the lid system 102 is shown in FIG. 10; where the cover 104 includes a pair of lynch pins 126 that extend through the rails 12 and 14 and into opposing side edges 128 to secure the cover 104 to the right and left side rails 12 and 14. This eliminates the need for the rod 38 and its additional weight in the construction of the manual litter box 10.

The rake assembly 58 includes a predetermined number of tines 60 that are used to comb through the kitty litter 61 in a litter tray or the disposable litter tray cartridges 44. The tines 60 are angled backward with respect to the motion direction of the raking assembly 58 and are carried just above the bottom surface of the tray 44 within the kitty litter crystals at all times by the chassis or bridge 46, transversely disposed above the litter box 10. The chassis 46 carries a plurality of spaced apart wire tines 60 connected to the lead frame 62 forming a rake to comb the kitty litter for animal waste and is supported by a pair of spaced apart vertical wire legs 64 and 66 attached at the other end of the wire lead frame 62. Each tine 60 may be formed from cylindrical steel wire, for example 16 AWG, which has a much higher stiffness than plastic and further allows the use of smaller diameter cross sections, that is critical to reducing drag through the crystal litter. The round cross section also has a much smaller surface area than a more aerodynamic shape which facilitates moving through crystal litter. Also each pair of tines 60 may be made up of a single piece of wire bent into a U-shape. The U-shape eliminates sharp ends on the rake tines 60 providing rounded, smooth ends that protect the user and cat. The rake assembly 58 is capable of being moved by the shuttle or a lever action adapted to move the rake wire lead 62 curved in a half circle to be guided along the rounded tops 80 and 82 of the side rails 12 and 14. Also, the shuttle carriage 46 could be adapted to have a protrusion located in a predetermined position on the side of the shuttle 46 to move the rake assembly 58 and its tines 60 through the litter in the box by action of the user's foot or a mechanism that a pumping action of the foot would case the shuttle move across the litter tray cartridges 44. So there are other alternatives to move the rake assembly 58 and its shuttle 46 across the manual litter box 10 with the rake assembly 58 having its rake tines 60 flip by a frictional engagement with some type of frictional material 84 strategically placed along the side rails 12 and 14.

In addition, the tines 60 are formed of a metal wire to be flexible which reduces drag on the rake tines 60 by causing the tines 60 to flex as it moves through the crystal litter. During a cleaning stroke of the shuttle 46, the tines 60 flex back and forth and side to side to facilitate movement through crystal litter. Moreover, as best shown, for example in FIGS. 1 and 6, the rake tines 60 are formed and supported by the two legs 64 and 66. The leg portions 64 and 66 are bent in a U-shape to fit over the top rounded edges 80 and 82 on each side rail 12 and 14, respectively, and U-shaped portion of the legs 64 and 66 slidably ride along the top of each rail in a generally friction or non-friction engagement depending upon the load formed by the crystals and waste in the litter tray 44 during the cleaning and return operation of the shuttle carriage 46 to its home position 92. The rake tines 60 extend downwardly in an angle that is tipped back with respect to the direction of travel of the rake assembly 60. The spacing between each of the tines 60 may be 3-20 mm. In particular, each pair of tines 60 may be formed by bending a length of wire into a U-shape having a bend radius of 1 to 5 mm, with two extending tines spaced 10 mm apart, preferable for crystal litter particles that are 4-5 mm in size.

Each U-shaped pair of tines 60 is spaced approximately 10 mm from an adjacent U-shaped pair of tines 60. The spacing between the tines 60 is selected as a function of the maximum particle size of the litter, both for crystal and non-crystal litter types. So the alternate spacing of the tines 60 is capable to meet whatever litter happens to be the preferred litter for the pet or circumstances involved.

For example, the spacing between the tines 60 may be selected to be slightly larger than the maximum particle size of the litter to some multiple of the maximum particle size of the litter. A given sample of litter will have a distribution of particle sizes, with a defined maximum. In sizing the tine 60 spacing with respect to the litter particle size, a balance is achieved which allows the rake tines 60 to pass through the litter easily yet still allow the rake to redistribute and mix the litter after a cat has disturbed the litter bed by digging and piling the kitty litter 61 non-uniformly. If the tines 60 spacing is too small with respect to the litter particle size, the rake cannot easily flow trough the litter and excessive plowing occurs. The same problem results if the rake tines 60 back angle is too small for a given tine 60 spacing and litter particle size. However, if the rake tines 60 spacing is too large, then the rake tines do not adequately capture and remove solid cat waste.

Also, if the tine 60 spacing is too large with respect to the litter size, then the litter is not adequately redistributed after being disturbed by a cat. Through appropriate election of tine 60 spacing and tine 60 back-angles, various size litters can be accommodated. For example, for crystal litter with a particle size distribution of 2-5 mm, a tine spacing of approximately 10 mm and a back-angle of 45 degrees achieves good mixing and redistribution, permits rake 120 travel through the litter with little effort on the shuttle handle 56 to move the shuttle carriage 46 and the rake assembly 58 and with limited wave and plowing of the litter to one side of the bed, and permits the rake tines 60 to capture and remove all or most of the solid cat waste deposited into the litter bed.

In accordance with one aspect of the invention, the system lid 102 and the tray lid 104 may be magnetically coupled together so that when the system lid 102 rotates upward, the tray lid 104 likewise rotates upward. Alternatively, there are other various mechanical coupling methods are contemplated for coupling the system lid 102 and the tray lid 104. Examples of those and other features can be found in the pending '068 patent application which is hereby incorporated by reference thereto for such examples. The rake assembly 58 in combination with the shuttle carriage 46 as previously shown in the '068 patent may provide the ability to lift the cover 104 on the waste compartment 98 on the cartridge trays 44. However, the magnetic coupling allows the manual litter box 10 to be quickly and easily decoupled and separated from the litter tray 44. In particular, the lid system 102 may be provided with a magnet on its underside. The tray lid 104 may be provided with a magnetic material and positioned to be aligned with one or more magnets carried by the system lid 102 when the litter tray 44 is registered within the manual litter box 10. As such, when the lid cover 104 rotates upwardly by operating the pedal 106, the magnetic attraction will cause the tray lid 100 to rotate in the same direction. The strength of the magnet is sized so that the lid system 102 is easily magnetically decoupled from the tray lid 100 when the manual litter box 10 is being picked up or tilted so that the litter tray 44 can be easily removed and replaced.

The importance of backward angle of the rake tines 60 with respect to travel direction for large size litter such as crystal litter is that it eliminates the wave in front of the rake assembly 58 thus allowing the manual litter box 10 to be used with crystal litter. Another important benefit of the self flipping rake designs is that the rake tines 60 automatically reverses angle with a change in rake assembly 58 travel direction. This action facilitates raking in both directions, increasing the degree of litter mixing. With better litter mixing, the litter absorbs urine odor better and lasts longer, permitting a longer period of operation before user intervention. Furthermore, the self flipping rake tines 60 distributes litter evenly in both rake tine 60 travel directions, preventing a bias of litter to one end of the litter cartridge 44 over time. Furthermore, bi-directional raking with the tines 60 fully disposed into the litter redistributes and levels the litter bed after a cat has disturbed the litter bed by digging and piling of the litter non-uniformly.

While the specific embodiments have been illustrated and described, numerous modifications come to mind without significantly departing from the spirit of the invention and the scope of protection is only limited by the scope of the accompanying claims.

We claim:

1. A manual cleaning litter box comprising:
   a pair of opposing and spaced apart side rails having an interior side and an exterior side including a protrusion extending beyond a rear end of each side rail for attachment;
   a rear wall removably affixed in an assembled position to the protrusion on each side wall to form three sides of the manual litter box;
   a waste cover affixed between a front end of each side rail to form four sides of the manual litter box;
   a rake assembly including spaced apart tines for combing through kitty litter within the box during a cleaning stroke from a first position to a second position;
   a chassis mounted to the exterior of the side rails for carrying said rake assembly;
   a shuttle handle attached to the chassis for driving the tines angled in the direction of travel of said rake assembly through the kitty litter toward a waste compartment to the second position; and
   means mounting on the manual litter box for frictional engaging the rake assembly causing the tines to flip in the direction of travel back to the first position and vice versa to the second position.

2. The manual litter box as recited in claim 1, further including a non-attached litter tray cartridge wherein said litter cartridge, includes a waste cover hinged on one end.

3. The manual litter-box as recited in claim 1, wherein said rake assembly and said shuttle chassis assembly is configured to travel in a single plane.

4. The manual litter box as recited in claim 1, further including a disposable or a reusable litter tray.

5. The manual litter box as recited in claim 4, wherein the litter box is tilted onto the rear wall to stand the litter box on end when changing the tray or storing the litter box.

6. A manual cleaning litter box comprising:
   a pair of opposing and spaced apart side rails having an interior side and an exterior side including a protrusion extending beyond a rear end to each side rail for attachment;
   a rear wall with an interior and exterior side removably affixed in an assembled position to the protrusion on each side wall to form three sides of the manual litter box;
   a waste cover affixed between a front end of each side rail to form four sides of the manual litter box;
   a general rectangular and disposable litter tray with four sides having a top edge of a predetermined height and having a waste compartment with a hinged cover at one end of the box corresponding to the waste cover and removably attached to the waste cover and further including an open litter compartment extending the remaining length of the disposable tray creating a predetermined space for a cat to enter the open litter compartment to void itself of waste and further corresponding to the interior perimeter of the manual litter box for having the manual litter box encompass the litter tray within the box perimeter with the side of the open litter compartment closely adjacent the interior sides of the each side rail and rear wall;
   a rake assembly including spaced apart tines for combing through kitty litter within the box during a cleaning stroke from a first position to a second position;
   a chassis mounted to the exterior of the side rails for carrying said rake assembly;
   a shuttle handle attached to the chassis for driving the tines angled in the direction of travel of said rake assembly through the kitty litter toward a waste compartment to the second position; and
   means mounting on the manual litter box for frictional engaging the rake assembly causing the tines to flip in the direction of travel back to the first position and vice versa to the second position.

7. The manual litter box of claim 6, wherein the waste cover further includes a foot pedal attached to the front of the waste cover and a pair of clips on the underside of the waste cover to clip to a metal rod affixed between the front ends of each side rail so that the waste cover rotates about the rod upwardly at the end opposite the foot pedal when the user steps on the foot pedal of the waste cover.

8. The manual litter box of claim 6, wherein the waste cover includes a pair of spaced apart magnets located on the underside of the waste cover and the hinged cover of the disposable tray include a pair of spaced apart metal tabs that are attached to the magnets so that stepping on the waste cover pedal rotates the hinged cover open over the waste compartment of the disposable tray when depositing the solid waste from the cat into the waste compartment by pulling the chassis to the second position with the tines angled underneath the hinged cover of the waste compartment.

9. The manual litter box of claim 6, wherein the side rails and rear walls have a slanted lip extending over the top edges of the litter tray to direct kitty waste into the disposable tray and the slanted lips are joined together mitered corners of approximately a 45°angle.

10. A manual cleaning litter box comprising:
   a pair of opposing and spaced apart side rails having an interior side and an exterior side;
   a rear wall with an interior and exterior side affixed in an assembled position to each side wall to form three sides of the manual litter box;
   a waste cover affixed between a front end of each side rail to form four sides of the manual litter box;
   a generally rectangular and disposable or reusable litter tray with four sides having a top edge of a predetermined height and having a waste portion corresponding generally to the waste cover affixed to the litter box and further including an open litter portion extending the remaining length of the disposable tray creating a predetermined space for a cat to enter the open litter portion to void itself of waste and further corresponding to the interior perimeter of the manual litter box for having the manual litter box encompass the litter tray within the box perimeter with the side of the open litter portion closely adjacent the interior sides of the each side rail and rear wall;
   a rake assembly including spaced apart tines for combing through kitty litter within the box during a cleaning stroke from a first position to a second position;
   a chassis mounted to the side rails for carrying said rake assembly;
   a shuttle handle attached to the chassis for moving the tines of said rake assembly through the kitty litter toward the waste portion at the second position.

11. The manual litter box as recited in claim 10, wherein the rake assembly including the spaced apart tines for combing through kitty litter within the box during a cleaning stroke from a first position to a second position flips in orientation when moving back from the second position to the first position from resistance of the tines in the litter or from a mechanical device on the litter box.

12. The manual litter box of claim 10, further including means mounting on the manual litter box for engaging the rake assembly causing the tines to flip in the direction of travel back to the first position and vice versa to the second position.

13. The manual litter box of claim 10, wherein the waste cover further includes a foot pedal attached to the front of the waste cover so that the waste cover rotates upwardly at the end opposite the foot pedal when the user steps on the foot pedal of the waste cover.

14. The manual litter box of claim 10, wherein the waste cover extends over the waste portion of the disposable tray when depositing the solid waste from the cat into the waste portion by pulling the chassis to the second position with the tines underneath the waste cover over the waste portion of the tray.

15. The manual litter box of claim 10, wherein the side rails and rear walls have a lip extending over the top edges of the litter tray to direct kitty waste into the disposable or reusable tray.

16. The manual litter box of claim 10, wherein the litter tray includes a waste tray lid attached to one end of the litter tray for covering the cat waste.

17. The manual litter box of claim 16, wherein the waste cover further includes means for attaching to the tray lid to rotate the tray lid upwardly when depositing the cat waste under the tray lid.

18. The manual litter box of claim 10, wherein the litter box is tilted onto the rear wall to stand the litter box on end when changing the tray or storing the litter box.

\* \* \* \* \*